United States Patent [19]
Treadway

[11] Patent Number: 6,100,313
[45] Date of Patent: *Aug. 8, 2000

[54] UV-CURABLE ABRASION-RESISTANT COATING COMPOSITION

[75] Inventor: Gerald D. Treadway, Penngrove, Calif.

[73] Assignee: The Walman Optical Company, Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/813,559

[22] Filed: Mar. 7, 1997

[51] Int. Cl.$^7$ .................................................... C08F 2/46
[52] U.S. Cl. ........................................ 522/170; 523/433
[58] Field of Search ........................... 524/529; 522/170; 523/433

[56] References Cited

U.S. PATENT DOCUMENTS

| | | |
|---|---|---|
| 2,942,019 | 6/1960 | Pike et al. . |
| 3,166,527 | 1/1965 | Ender . |
| 3,291,775 | 12/1966 | Holm . |
| 3,591,408 | 7/1971 | Marzocchi et al. . |
| 3,837,876 | 9/1974 | Mayuzumi et al. . |
| 3,961,977 | 6/1976 | Koda et al. . |
| 3,986,997 | 10/1976 | Clark . |
| 4,027,073 | 5/1977 | Clark . |
| 4,029,842 | 6/1977 | Yoshida et al. . |
| 4,098,840 | 7/1978 | Yoshida et al. . |
| 4,196,014 | 4/1980 | Taniyama et al. . |
| 4,208,503 | 6/1980 | Martin . |
| 4,241,116 | 12/1980 | Taniyama et al. . |
| 4,378,250 | 3/1983 | Treadway ............................ 106/287.11 |
| 4,426,431 | 1/1984 | Harasta ...................................... 522/15 |
| 4,478,963 | 10/1984 | McGarry ................................. 523/205 |
| 4,623,676 | 11/1986 | Kistner . |
| 4,668,601 | 5/1987 | Kistner . |
| 4,719,146 | 1/1988 | Hohage et al. . |
| 4,855,180 | 8/1989 | Kawamura . |
| 4,895,767 | 1/1990 | Mori et al. . |
| 5,221,560 | 6/1993 | Perkins et al. . |
| 5,267,019 | 11/1993 | Sawaragi . |
| 5,314,947 | 5/1994 | Sawaragi . |
| 5,385,955 | 1/1995 | Tarshiani et al. . |

FOREIGN PATENT DOCUMENTS

| | | |
|---|---|---|
| WO94/10230 | 5/1994 | WIPO . |

*Primary Examiner*—Paul R. Michl
*Attorney, Agent, or Firm*—Fredrikson & Byron, PA

[57] ABSTRACT

A coating composition for forming a transparent, abrasion-resistant coating upon eyeglass lenses or other transparent substrates, the composition comprising a binder component and a curing agent component and being substantially free of volatiles. The binder component comprises the hydrolysis product of an epoxy-functional alkoxy silane, a polyglycidyl ether, and an acrylic monomer having an acrylic functionality of not more than two. The curing agent component comprises a cationic photoinitiator and a free radical photoinitiator.

8 Claims, No Drawings

UV-CURABLE ABRASION-RESISTANT COATING COMPOSITION

FIELD OF THE INVENTION

The invention relates to the field of transparent coatings for transparent objects such as eyeglass lenses, windows and the like, and refers particularly to a coating having an index of refraction essentially equal to that of the substrate that is coated.

BACKGROUND OF THE INVENTION

Transparent plastic materials such as eyeglass lenses, television screen face plates and the protective coatings on photographic prints often are quite soft and are subject to becoming dull and hazy due to scratching and abrasion during use. Polycarbonate eyeglass lenses, for example, are strong and shatter resistant but also are relatively soft and susceptible to scratching. Television screen face plates similarly are made of flexible, shatter resistant plastic materials such as polycarbonate and poly (methylmethacrylate), and these also can be scratched or abraded.

Various coatings have been proposed for eyeglasses and other transparent plastic materials to reduce their propensity to become scratched and abraded. One such composition is shown in U.S. Pat. No. 4,378,250 (Treadway, et al.) granted Mar. 29, 1983. Other coatings are shown in U.S. Pat. Nos. 5,367,019 (Sawara), 4,855,180 (Kawamura), 4,895,767 (Mori et al.) and 4,719,146 (Hohage et al.) Besides being abrasion resistant, coatings for eyeglass lenses should also be capable of being tinted by treatment with a dye which becomes incorporated in the coating. As a general observation, the tintability of a coating tends to decrease as its hardness and scratch resistance increases, and vice-versa.

Harasta, et al. U.S. Pat. No. 4,426,431 discusses a coating composition referred to as a "hybrid" system because it employs a solution, in a solvent such as propylene carbonate, an epoxy compound and a cationic initiator for it, and an acrylic compound and a free radical initiator for it. In general, coating compositions suitable for use in forming protective transparent coatings on eyeglass lenses and the like are provided in solution in a volatile solvent, the solvent serving as a low viscosity vehicle to enable the coating composition to be uniformly spread upon a surface and to accept dye treatments. The solvents that are employed are for the most part organic, and must be used and disposed of carefully.

Perkins et al. U.S. Pat. No. 5,221,560 describes a coating composition containing a polyfunctional, polymerizable non-acrylate functional ether, a radiation-sensitive initiator, and colloidal silica in an amount providing at least 25% by weight of the total solids of the composition, the silica being reacted with a small amount of a hydrolyzed acryloxy-functional or glycidoxy-functional silane.

It would be desirable to provide a coating composition that is capable of forming coatings having both excellent abrasion resistance and dye acceptance.

SUMMARY OF THE INVENTION

The present invention utilizes a coating composition that utilizes that accepts dye well, that provides exceptional abrasion-resistance, and that is substantially free of volatiles. The composition includes at least 10% by weight, solids basis, of an at least partially hydrolyzed epoxy-functional alkoxysilane. Included also in the composition is a polymerizable ether, desirably cationically polymerizable, selected from the group consisting of glycidyl ethers, allyl ethers and vinyl ethers, and an ethylenically unsaturated monomer component, desirably an acrylic monomer component that preferably includes a monomer having an acrylic functionality of not more than two. A cationic photoinitiator is employed to affect polymerization of the epoxy-functional components, and a free radical initiator is employed to initiate polymerization of the ethylenically unsaturated coating components, that is, the acrylic-functional component. The polymerizable ethers improve tintability of the resulting coating, and use of the acrylic monomer results in excellent adhesion to polycarbonate substrates.

Hydrolysis of the alkoxysilane may but need not be complete, and preferably, the alkoxysilane is reacted with a stoichiometricly sufficient quantity of water to hydrolyze at least 50% of the alkoxy groups and most preferably from about 60% to about 70% of the alkoxy groups. In a preferred embodiment, the coating composition is substantially free of volatile solvents and also preferably is free of silica.

DESCRIPTION OF THE PREFERRED EMBODIMENTS

The epoxy functional alkoxy silane precursor of the at least partially hydrolyzed polymerizable ingredient is preferably an epoxyalkylalkoxysilane of the following structure:

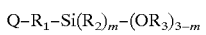

$$Q-R_1-Si(R_2)_m-(OR_3)_{3-m}$$

wherein $R_1$ is a $C_1-C_{14}$ alkylene group, $R_2$ and $R_3$ independently are $C_1-C_4$ alkyl groups and Q is a glycidoxy or epoxycyclohexyl group, and m is 0 or 1. The alkoxy groups are at least partially hydrolyzed to form silanol groups with the release of the $R_3OH$ alcohol, and some condensation of the silanol groups occurs. Epoxy reactivity is preserved, however. Many epoxy-functional alkoxysilanes are suitable as hydrolysis precursors, including glycidoxymethyl-trimethoxysilane, glycidoxymethyltriethoxysilane, glycidoxymethyl-tripropoxysilane, glycidoxymethyl-tributoxysilane, b-glycidoxyethyltrimethoxysilane, b-glycidoxyethyltriethoxysilane, b-glycidoxyethyl-tripropoxysilane, b-glycidoxyethyl-tributoxysilane, b-glycidoxyethyltrimethoxysilane, a-glycidoxyethyl-triethoxysilane, a-glycidoxyethyl-tripropoxysilane, a-glycidoxyethyltributoxysilane, g-glycidoxypropyl-trimethoxysilane, g-glycidoxypropyl-triethoxysilane, g-glycidoxypropyl-tripropoxysilane, g-glycidoxypropyltributoxysilane, b-glycidoxypropyl-trimethoxysilane, b-glycidoxypropyl-triethoxysilane, b-glycidoxypropyl-tripropoxysilane, b-glycidoxypropyltributoxysilane, a-glycidoxypropyl-trimethoxysilane, a-glycidoxypropyl-triethoxysilane, a-glycidoxypropyl-tripropoxysilane, a-glycidoxypropyltributoxysilane, g-glycidoxybutyl-trimethoxysilane, d-glycidoxybutyl-triethoxysilane, d-glycidoxybutyl-tripropoxysilane, d-glycidoxybutyl-tributoxysilane, d-glycidoxybutyl-trimethoxysilane, g-glycidoxybutyl-triethoxysilane, g-glycidoxybutyl-tripropoxysilane, g-propoxybutyl-tributoxysilane, d-glycidoxybutyl-trimethoxysilane, d-glycidoxybutyl-triethoxysilane, d-glycidoxybutyl-tripropoxysilane, a-glycidoxybutyl-trimethoxysilane, a-glycidoxybutyl-triethoxysilane, a-glycidoxybutyl-tripropoxysilane, a-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-triethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexy)butyl-triethoxysilane, (3,4-epoxycyclohexyl)-butyl-tripropoxysilane, and (3,4-epoxycyclohexyl)butyl-tributoxysilane.

A particularly preferred epoxyalkylalkoxysilane is γ-glicidoxypropyl trimethoxy silane due to its wide commercial availability.

Hydrolysis of the epoxy-functional alkoxysilane precursor may occur in an acidic environment, and reference is made to U.S. Pat. No. 4,378,250, the teachings of which are incorporated herein by reference. Hydrolysis of the alkoxy groups liberates the associated alcohol to form silanol groups; these, in turn, are relatively unstable and tend to condense spontaneously. Preferably, the alkoxysilane is reacted with a stoichiometricly sufficient quantity of water to hydrolyze at least 50% of the alkoxy groups and most preferably from about 60% to about 70% of the alkoxy groups. For the hydrolysis of an epoxy-functional trialkoxy silane, good results have been obtained by reacting the silane with a stoichiometricly sufficient quantity of water to hydrolyze two-thirds of the alkoxy groups.

The at least partially hydrolyzed epoxy-functional silane is present in the coating compositions of the invention at a weight concentration (solids basis) of 10% to 75%, and preferably 20% to 50%.

Useful cationic initiators for the purposes of this invention include the aromatic onium salts, including salts of Group Va elements, such as phosphonium salts, e.g., triphenyl phenacylphosphonium hexafluorophosphate, salts of Group VIa elements, such as sulfonium salts, e.g., triphenylsulfonium tetrafluoroborate, triphenylsulfonium hexafluorophosphate and triphenylsulfonium hexafluoroantimonate, and salts of Group VIIa elements, such as iodonium salts, e.g., diphenyliodonium chloride. The aromatic onium salts and their use as cationic initiators in the polymerization of epoxy compounds are described in detail in U.S. Pat. No. 4,058,401, "Photocurable Compositions Containing Group VIA Aromatic Onium Salts," by J. V. Crivello issued Nov. 15, 1977; U.S. Pat. No. 4,069,055, "Photocurable Epoxy Compositions Containing Group VA Onium Salts," by J. V. Crivello issued Jan. 17, 1978; U.S. Pat. No. 4,101,513, "Catalyst For Condensation Of Hydrolyzable Silanes And Storage Stable Compositions Thereof," by F. J. Fox et al. issued Jul. 18, 1978; and U.S. Pat. No. 4,161,478, "Photoinitiators," by J. V. Crivello issued Jul. 17, 1979, the disclosures of which are incorporated herein by reference. Other cationic initiators can also be used in addition to those referred to above; for example, the phenyldiazonium hexafluorophosphates containing alkoxy or benzyloxy radicals as substituents on the phenyl radical as described in U.S. Pat. No. 4,000,115, "Photopolymerization Of Epoxides," by Sanford S. Jacobs issued Dec. 28, 1976, the disclosure of which is incorporated herein by reference. Preferred cationic initiators for use in the compositions of this invention are the salts of Group VIa elements and especially the sulfonium salts. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro arsenate, and hexafluoro antimonate.

The polymerizable ether component imparts tintability, and is selected from the group consisting of glycidyl ethers, allyl ethers and vinyl ethers. The polymerizable ethers may be monofunctional or polyfunctional, preferably polyfunctional, and desirably are cationically polymerizable. Mixtures of the polymerizable ethers may be used, particularly mixtures of glycidyl ethers and vinyl ethers. These ethers preferably are non-acrylate functional.

Glycidyl ethers useful in the invention include triglycidyl ether, γ-glycidoxypropyl trimethoxy silane, triglycidyl ether, 1,4-butanediol diglycidyl ether, Bisphenol A diglycidyl ether, the $C_8$–$C_{14}$ alkyl glycidyl ethers, butyl glycidyl ether, cresyl glycidyl ether, phenyl glycidyl ether, nonylphenyl glycidyl ether, p-tert-butylphenyl glycidyl ether, 1,4-butanediol diglycidyl ether, neopentyl glycol diglycidyl ether, resorcinol diglycidyl ether, polyglycidyl ethers of aliphatic polyols, cyclohexane dimethanol diglycidyl ether, 2-ethylhexyl glycidyl ether, polyglycol diepoxide, polyglycidyl ether of castor oil, trimethylolethane triglycidyl ether, trimethylolpropane triglycidyl ether, dibromoneopentyl glycol diglycidyl ether, and 3,4-epoxycyclohexyl methyl-3,4-epoxycyclohexane carboxylate. Glycidyl ethers, if used alone as the polymerizable ether, are present preferably in a weight concentration (solids basis) of from about 10% to about 50%.

Allyl ethers include 1,1,2,2,-tetraallyloxyethane, triallylcyanurate, polyallylglycidyl ether, and allylglycidyl ether. Allyl ethers, if used alone as the polymerizable ether, preferably are employed at a weight concentration (solids basis) of up to about 10%.

Vinyl ethers include triethylene glycol divinyl ether, diethylene glycol divinyl ether, tetraethylene glycol divinyl ether, dipropylene glycol divinyl ether, tripropylene glycol divinyl ether, 1,4-divinyloxybutane, and, as a preferred ether, cyclohexane dimethanol divinyl ether. If used alone as the polymerizable ether, a vinyl ether preferably is employed at a weight concentration (solids basis) not greater than about 15%, and most preferably in the range of about 5% to about 10%.

As noted above, the polymerizable ether ingredient may consist of a mixture of two or more ethers, the relative amounts of which are chosen so as to provide the cured coating with good tintability while maintaining acceptable adhesion to substrates. Employing too much of the polymerizable ether may tend to adversely affect adhesion of the coating to substrates, particularly polycarbonate substrates.

Of the ethylenically unsaturated monomers, vinyl acetate contributes to good adhesion to polycarbonate substrates. However, acrylic-functional monomers and oligomers are preferred. Useful acrylic compounds for improving adhesion to polycarbonate substrates include both mono and di-functional monomers, but other or additional polyfunctional acrylic monomers may also be included. Examples of monofunctional acrylic monomers include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers, including both difunctional and tri and tetrafunctional monomers, include neopentylglycol diacrylate, pentaerythritol triacrylate, 1,6-hexanediol diacrylate, trimethylolpropane triacrylate, tetraethylene glycol diacrylate, 1,3-butylene glycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate, 1,5-pentanediol dimethacrylate, and the like. The acrylic-functional monomers and oligomers preferably are employed at a weight concentration of from about 10% to about 50% on a solids basis Although photoactivated free-radical initiator are preferred, thermally activated free radical initiators may also be used. Useful photoinitiators for this purpose are the haloalkylated aromatic ketones, chloromethylbenzophenones, certain benzoin ethers, certain acetophenone derivatives such as diethoxyacetophenone and 2-hydroxy-2-methyl-1-phenylpropan-1-one. A preferred class of free-radical photoinitiators is the benzil ketals, which produce rapid cures. A preferred photoinitiator is α,α-dimethoxy-α-phenyl acetophenone (Iragacure™ 651, Ciba-Geigy, disclosed in U.S. Pat. Nos. 3,715,293 and 3,801,329). The most preferred photoinitiator, in accordance with this invention, is 2-hydroxy-2-methyl-1-phenylpropane-1-one (Darocure™ 1173, Ciba-Geigy Corporation). Specific examples of photoinitiators include ethyl benzoin ether, isopropyl benzoin ether, dimethoxyphenyl acetophenone, diethoxy acetophenone, and benzophenone.

The invention may be better understood by reference to the following non-limiting examples. Cured coatings were subjected to several tests, outlined as follows:

Scratch Resistance

The coated substrate is supported in a jig and a pad of 0000 grade steel wool attached to a support with a weight of 5 p.s.i. is rubbed across the surface automatically for 50 strokes, one stroke being forward and back. The change in haze is measured spectrophotometically, and is reported as the percentage loss in transmissivity.

Adhesion

Adhesion may be measured using the procedures of ASTM 3359. This test, in brief, provides for scoring of the cured coating with a sharp instrument in a cross-hatched fashion to leave diamond-shaped patches, followed by an attempt to lift the diamond-shaped patches from the substrate through the use of a pressure sensitive adhesive tape that is applied to the cross hatched surface and then pulled away. The degree to which the cross-hatched portions of the coating remain adhered to the substrate provides a measure of adhesion to that substrate, and is reported as the percentage of diamond-shapes that remain adhered to the substrate.

Tintability

A coated and cured sample is immersed in BPI Black Dye (Brain Power Inc.) at 98–102° C. for 15 minutes and then rinsed with water and dried. Transmissivity is measured spectrophotometrically, and tintability is reported as percentage transmissivity.

EXAMPLE 1

A master batch of the partial hydrolysis product of γ glycidoxy propyl trimethoxy silane is prepared as follows:

| | |
|---|---|
| γ-glycidoxy propyl trimethoxy silane | 868.3 gm |
| Water. | 131.2 gm |
| Conc. HCL | 0.5 gm |

The above ingredients are stirred together in a flask equipped with a condenser for 12–16 hours, during which substantially all of the volatiles are removed using a rotary evaporator. Sufficient water is used in this example to theoretically hydrolyze 2 of the 3 alkoxy groups.

EXAMPLE 2

| | |
|---|---|
| Master batch of Example 1. | 25.35 gm |
| Butane diol diacrylate | 23.47 gm |
| Trimethylol Propane Triglycidyl Ether | 37.55 gm |
| Mixed Triarylsulfonium Hexafluroantimonate Salts 50% in Propylene Carbonate (UVI 6974, Union Carbide) | 9.39 gm |
| 2-hydroxy-2-methyl-1-phenylpropane-1-one (Darocure ™ 1173, Ciba-Geigy Corporation) | 2.35 gm |
| Acrylated Silicone Flow Control Agent (Ebecryl ™ 1360, UCB Radcure Co.) | 1.89 gm |

The material was spin coated on a polycarbonate substrate and cured using a 300 watt per inch mercury bulb. The cured film exhibited the following properties.

| | |
|---|---|
| Scratch Resistance | <1% haze |
| Adhesion after tint | 100% (using 3M 600 tape) |
| Tintability | <10% transmission. |

EXAMPLE 3

| | |
|---|---|
| Master batch of Example 1 | 26.38 gm |
| Butane diol diacrylate | 34.2 gm |
| Trimethylol Propane Triglycidyl Ether | 19.54 gm |
| Trimethylol Propane Triacrylate | 9.77 |
| UVI 6974 | 4.88 |
| Darocure 1173 | 3.25 |
| Ebecryl 1360 | 1.98 |

The coating composition was coated on a polycarbonate substrate and cured as in Example 1. Testing results were as follows:

| | |
|---|---|
| Scratch Resistance | <0.5% Haze |
| Adhesion after tint | 100% |
| Tintability | <16.0% transmissivity |

EXAMPLE 4

| | |
|---|---|
| Master batch of Ex. 1 | 26.87 |
| Butane Diol Diacrylate | 24.88 |
| Trimethylol Propane Triglycidyl Ether | 29.85 |
| Trimethylol Propane Triacrylate | 9.95 |
| UVI 6974 | 2.99 |
| Darocure 1173 | 3.48 |
| Ebecryl 1360 | 1.99 |
| Total | 100.0 |

The coating composition was coated and tested as in Example 1, yielding the following test results:

| | |
|---|---|
| Scratch resistance | <0.5% Haze |
| Adhesion after tint | 100% |
| Tintability | <15.0% Transmission |

EXAMPLE 5

| | |
|---|---|
| Master batch of Example 1 | 22.83 |
| Butane Diol Diacrylate | 27.40 |
| Dipentaerythritol Hydroxy Pentacrylate | 22.83 |
| Cyclohane 1,4,Dimethylol Divinyl Ether | 18.26 |
| UVI 6974 | 2.28 |
| Darocure 1173 | 4.56 |
| Acrylated Silicone Flow Control Agent (BYK ™ 371, BYK Co.) | 1.84 |
| Total | 100.0 |

The composition was coated and cured as in Example 1, and the following test results were obtained:

| | |
|---|---|
| Scratch Resistance | <1.0% Haze |
| Adhesion after tint | 100k % |
| Tintability | <6.0% Transmission |

EXAMPLE 5

| | |
|---|---|
| Master batch of Example 1 | 27.40 |
| Butane Diol Diacrylate | 27.40 |
| Dipentaerythritol Hydroxy Pentacrylate | 22.83 |
| Cyclohane 1,4,Dimethylol Divinyl Ether | 13.70 |
| UVI 6974 | 2.28 |
| Darocure 1173 | 4.57 |
| BYK 371 | 1.83 |
| Total | 100.0 |

The composition was coated on Polycarbonate as in Example 1. The following test results were obtained:

| | |
|---|---|
| Scratch Resistance | <0.8% Haze |
| Adhesion after tint | 100% |
| Tintability | <6.0% Transmission |

While a preferred embodiment of the present invention has been described, it should be understood that various changes, adaptations and modifications may be made therein without departing from the spirit of the invention and the scope of the appended claims.

What is claimed is:

1. A substantially solvent-free coating composition for forming a transparent, abrasion-resistant, dye-accepting coating upon a substrate, the composition comprising a binder component and a curing agent component, the binder component comprising at least 10% by weight, solids basis, of the hydrolysis product of an epoxy-functional alkoxy silane, a polymerizable ether selected from the group consisting of glycidyl ethers, allyl ethers and vinyl ethers, and an ethylenically unsaturated monomer other than said polymerizable ether, the curing agent component comprising a cationic initiator and a free radical initiator, and the composition being substantially free of silica.

2. The coating composition of claim 1 wherein said ethylenically unsaturated monomer comprises an acrylic monomer.

3. The coating composition of claim 1 wherein said ethylenically unsaturated monomer comprises vinyl acetate.

4. The coating composition of claim 1 wherein said hydrolysis product comprises the product of the partial hydrolysis of a glycidoxyalkylalkoxy silane.

5. The coating composition of claim 1 wherein said hydrolysis product is present in an amount ranging from 10 to 75 weight percent of the coating composition.

6. The coating composition of claim 1 wherein said hydrolysis product is the reaction product of γ-glycidoxypropyl trimethoxysilane and a stoichiometrically sufficient quantity of water to hydrolyze greater than 50% of the methoxy groups.

7. The coating composition of any one of claims 1–4, wherein the coating composition is substantially free of volatiles.

8. A substantially solvent-free coating composition for forming a transparent, abrasion-resistant, dye-accepting coating upon a substrate, the composition comprising a binder component and a curing agent component, the binder component comprising at least 10% by weight, solids basis, of the hydrolysis product of an epoxy-functional alkoxy silane, a polymerizable ether, other than an acrylic-functional ether, selected from the group consisting of glycidyl ethers, allyl ethers and vinyl ethers, and from about 10% to about 50% by weight of an ethylenically unsaturated acrylic monomer, the curing agent component comprising a cationic initiator and a free radical initiator, and the composition being substantially free of silica.

* * * * *